United States Patent [19]
Ward et al.

[11] 3,894,346
[45] July 15, 1975

[54] ELECTRONIC KEYBOARD TRAINER

[75] Inventors: John R. Ward, Alexandria; Daniel J. Fowley, Jr., Charlottesville, both of Va.

[73] Assignee: Kee, Inc., Arlington, Va.

[22] Filed: Nov. 2, 1973

[21] Appl. No.: 412,400

Related U.S. Application Data

[63] Continuation of Ser. No. 175,223, Aug. 26, 1971, abandoned.

[52] U.S. Cl. ............................................. 35/8; 35/6
[51] Int. Cl. ............................................. G09b 13/02
[58] Field of Search ............... 35/5, 6, 8 R, 8 A, 9 R, 35/9 A, 9 B, 48 R, 48 B; 40/28 C

[56] References Cited
UNITED STATES PATENTS

| | | | |
|---|---|---|---|
| 2,931,108 | 4/1960 | Brown | 35/5 |
| 3,091,876 | 6/1943 | Cole | 40/28 C |
| 3,166,856 | 1/1965 | Uttal | 35/6 |
| 3,176,415 | 4/1965 | Leathers | 35/48 B |
| 3,284,929 | 11/1966 | Azure | 35/48 B |
| 3,299,254 | 1/1967 | Dobbins et al. | 235/61.7 |
| 3,300,877 | 1/1967 | Feder | 35/9 A |
| 3,371,321 | 2/1968 | Adams | 35/8 R X |
| 3,423,845 | 1/1969 | Edge et al. | 35/6 |
| 3,460,270 | 8/1969 | Blitz et al. | 35/6 |
| 3,623,157 | 11/1971 | Stapleford | 35/35 R X |
| 3,643,254 | 2/1972 | Proebsting | 35/6 X |
| 3,675,339 | 7/1972 | Lamarca | 35/6 |

*Primary Examiner*—Lawrence Charles
*Assistant Examiner*—Vance Y. Hum
*Attorney, Agent, or Firm*—Shlesinger, Arkwright, Garvey & Dinsmore

[57] ABSTRACT

A keyboard trainer has a keyboard, display panel, and program reader wherein keyboard code outputs are matched with the program reader outputs in a logic circuit to provide student prompting, error scoring, program advance, and multi-media control.

14 Claims, 5 Drawing Figures

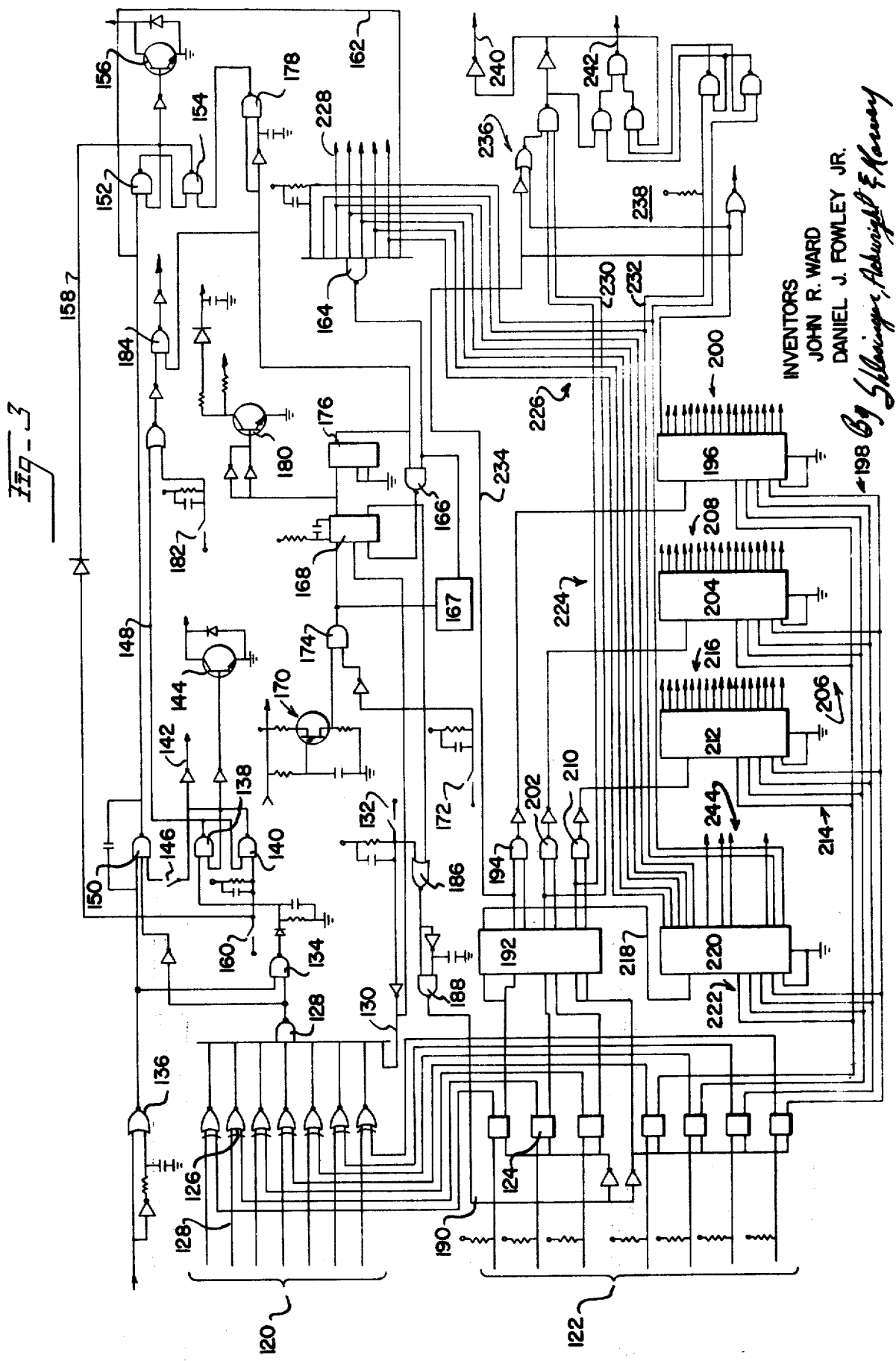

ELECTRONIC KEYBOARD TRAINER

This is a continuation of application Ser. No. 175,223, filed Aug. 26, 1971, and now abandoned.

BACKGROUND OF INVENTION

This invention relates to a keyboard trainer for teaching keyboard skills.

The use of keyboard instruments, such as typewriters, adding machines, vari-types, computer terminals, key punch machines and similar types of devices has become widespread within the last twenty-five years. To meet the demand for instruction in the use of such devices courses are offered by both public and private schools employing conventional class instruction techniques. In recent years, it has been recognized that these conventional instruction techniques can be omitted or supplemented by the use of specialized keyboard trainer units. These units permit the use of individual instruction in keyboard use, with the program presentation being geared to the students ability. These devices include a keyboard, a keyboard representation in which individual keys can be lighted as a prompt or a cue, and a controlled program device connected to both the keyboard and the keyboard display for presenting exercises to the student. Several basic types of such machines have been proposed, and placed in use heretofore, but they have had limitations either in operative design, or in versatility of operation.

Accordingly, it is an object of this invention to provide a new and improved keyboard trainer unit of simplified design and greater versatility.

One of the features of this invention is the use of a digital keyboard and program unit.

Another feature of this invention is the use of improved and simplified logic circuitry in the comparator and display circuitry.

A further feature of this invention is the provision of error scoring including automatic recording of the total number of strokes and errors, student acknowledgment of error, and automatic printing of the error.

A still further feature of the invention is the inclusion in the trainer of several different instruction modes, including a test mode.

Another feature of the invention is the multi-media control which permits the keyboard trainer to activate either audio or visual auxiliary equipment to be used as an adjunct to the keyboard trainer program unit.

These and further objects and advantages of the invention will become apparent from the following description and claims.

DESCRIPTION OF DRAWINGS

FIG. 3 shows the circuitry of the keyboard unit.

FIG. 4 is a block diagram showing the multi-media control circuit.

FIG. 5 discloses the keyboard display lamp control circuitry.

DESCRIPTION OF THE INVENTION

Figure 1:
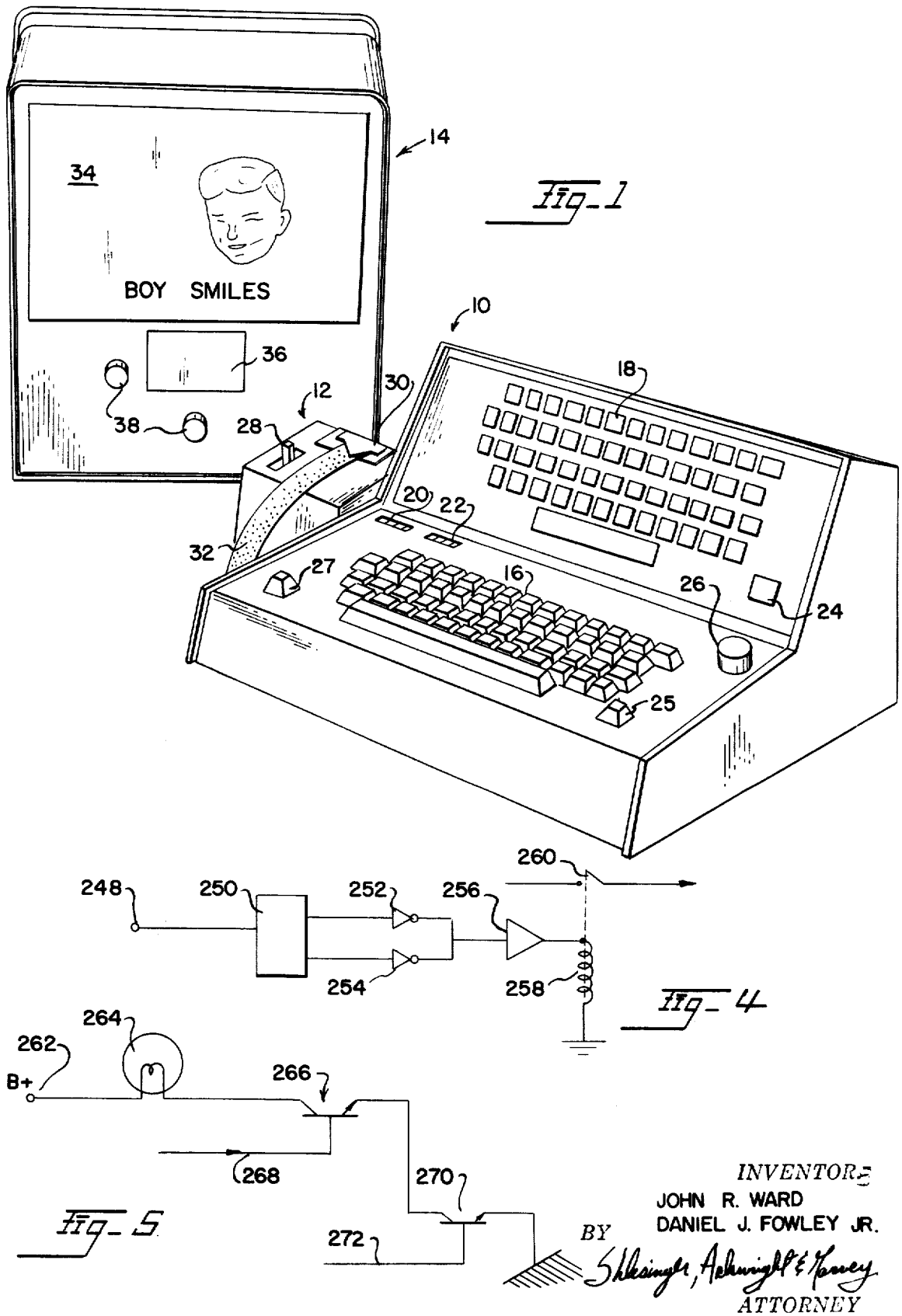
FIG. 1 is a perspective view of the keyboard trainer unit and an auxiliary pictorial display unit.

Referring to FIG. 1, the keyboard trainer generally indicated at 10, is used with a tape reader 12 to instruct the student in keyboard skills. The program of instruction is read by the tape reader 12 and fitted to the keyboard trainer unit 10. Audio visual equipment may be used with this assembly, as indicated by the multi-media unit 14, to provide either pictorial or sound instruction with the keyboard unit and tape reader assemblies.

The keyboard trainer unit 10 has a keyboard 16, which in this instance is a typewriter keyboard, and a matching display panel 18 which has individual lights corresponding with each of the individual keys. The display light for a given key is used as a prompt or cue for the student learning the keyboard. The individual lights corresponding to keys to be depressed can be lit progressively ahead of the student to teach the beginner who is learning positions of the keys on the keyboard, or for the more advanced student, to light only when an error has been made by the student.

The keyboard trainer counts the correct number of keys depressed by use of the counter 20, and the wrong number of keys depressed by the counter 22. Error light 24 lights when the student presses the wrong key. Error is acknowledged and the machine reset when the error reset key 25 is depressed. A mode switch 26 is positioned at the upper right of the keyboard to permit the student to select the type of display panel instruction.

The tape reader unit 12 is electrically connected to the keyboard trainer unit 10 to supply the electronic signals of the desired program to be used by the student to the keyboard trainer unit 10. It has a reader ready switch 28 to turn the unit on when the student is ready to proceed with the instruction program. A tape receiving section 30 receives the perforated tape 32 containing the program for the student. The coded tape is read by the tape reader unit 12 and an electrical output supplied to the keyboard trainer 10, which is compared to a similar electronic coded output produced when the student depresses one of the keys of the keyboard.

The multi-media unit is an auxiliary piece of equipment which permits the keyboard trainer to be used in conjunction with a visual display 34 and an audio output 36. Appropriate control knobs are shown at 38.

Figure 2:
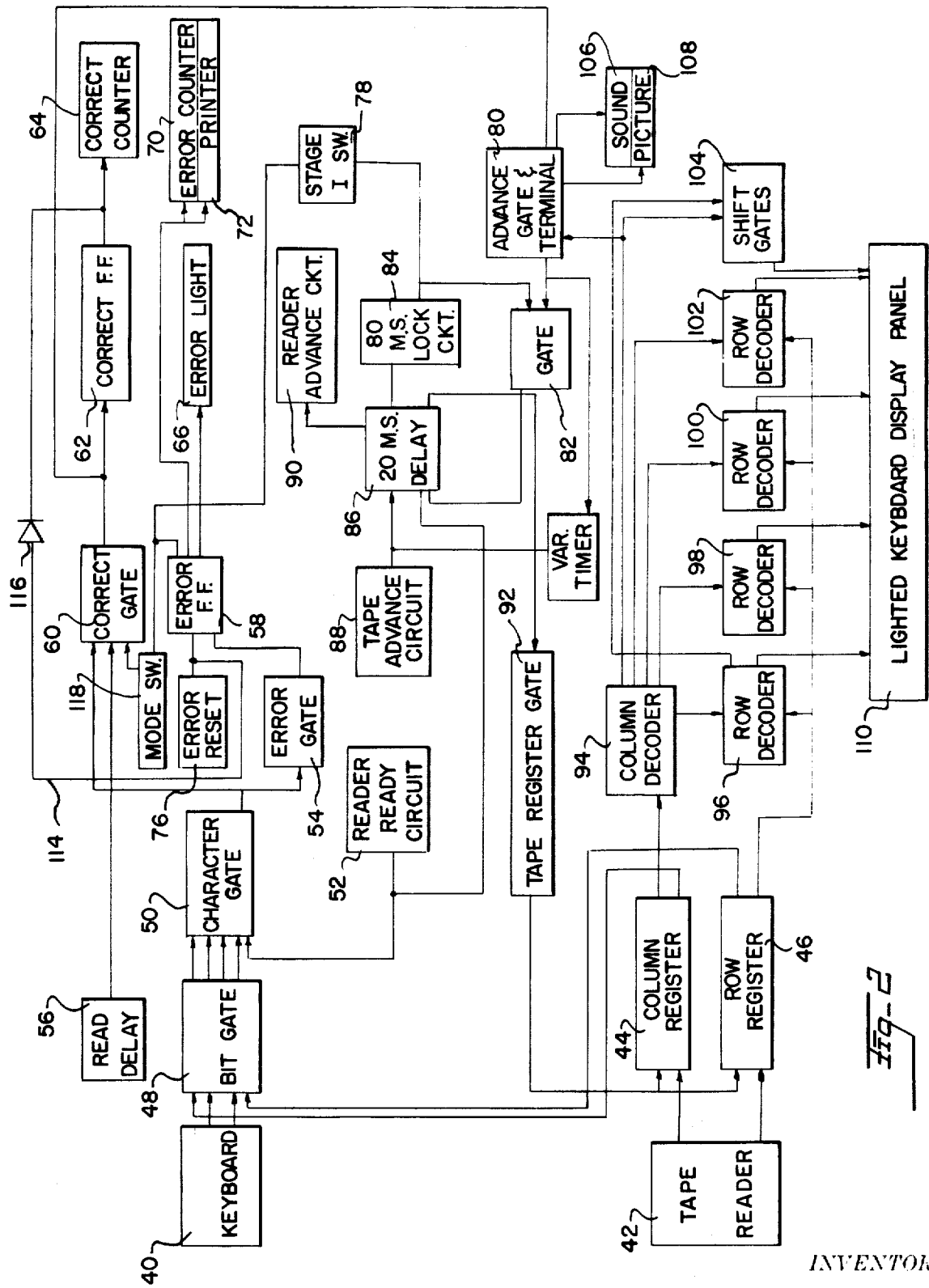
FIG. 2 is a block diagram of the circuitry of the keyboard trainer unit.

FIG. 2 shows a block diagram of the circuitry of the keyboard unit 16. The keyboard 40 and the tape reader 42 produce coded electronic outputs which are compared for similarity by the unit, and dependent upon a match various circuit controls are actuated. An electronic digital signal is supplied by the tape reader 42 to the column registers 44 and the row registers 46. The digital signals are stored in the registers and then subsequently passed up to the Bit gate 48 where they are compared with the digital code output from the keyboard. Both the tape reader and the keyboard in the preferred embodiment employ the digital ASCII code. The Bit gate 48 and the Character gate 50 check for a match of keyboard and tape reader signals and produce an output accordingly. The reader ready circuit 52 controls the output from the Character gate 50. If there is a miss-match of the two separate input signals, the comparator circuitry, namely the Bit and Charater gates will produce a miss-match signal. The signal is fed through the error gate 54 which senses the error or miss-match signal. The error gate comprises an AND gate and has an input from both the comparator gates 48 and 50 and the ready delay circuit 56. With the coincidence of the signals from the comparator and the read delay circuits indicating a miss-match of input signals from the keyboard and tape reader units, a signal is transmitted through the error gate circuit to the error flip-flop circuit 58.

If the Bit and Character gates have identical signals applied to them by the keyboard and tape reader circuits, a pulse indicating match of the signals is emitted by the character gate 50 and supplied to the correct gate circuit 60. In addition to the Character gate pulse, a pulse from the read delay circuit 56 and a voltage from the error flip-flop circuit 58 is applied to the gate. These signals are "ANDED" with the output signal going to the correct flip-flop circuit 62, the output of which goes to the Correct Counter circuit 64.

In the case of an error by the operator where there is no match between the keyboard and tape reader signals, the error flip-flop circuit 58 produces output signals which activate the error light 66, the error counter 70, and the error printer 72. Printing units for this use can be purchased. The stage 1 switch circuit 76 which controls the master panel transistor for display lights is also connected to the flip-flop circuit 58.

The output from the Correct gate circuit 60 travels along line 78 to the advance gate and terminal circuit 80. On receipt of the signal the advance gate 80 emits an indexing pulse which is passed on to the AND gate 82. This gate also receives an output pulse from the 80 millisecond lock circuit 84. The output from gate 82 is passed through the 20 millisecond delay circuit 86. The reader ready circuit 52 is also connected to circuit 86, as well as a tape advance circuit 88 which produces the tape advance timing pulse. On receipt of these three signals, an output signal is passed to the 80 millisecond lock circuit 84 and to the reader advance circuit 90.

A second output from the 20 millisecond delay circuit 86 proceeds to the tape register gate circuit 92. The output from this gate circuit is connected to the column and now register circuits 44 and 46 to strobe in the new data.

At the time that the content of the column and row register circuits 44 and 46 are supplied to the Bit and Character gate circuits 48 and 50, which comprises the comparator circuit of the unit, signals are also sent to control the lights of the keyboard display panel. The second column register output is connected to the column decoder 94, while the second output of the row register circuits 46 is connected to the row decoder 96. Successive output lines of the column decoder are connected to the row decoder units 98, 100, and 102. These decoders are also connected to the output of the row register circuits 46. The shift decoder 104 receives the outputs from the column decoder 94 and the row decoder 96.

It will be noted that the top output line from row decoder 96 is connected to the advance gate and terminal circuit 80 as well as to the shift decoder 104. This output signal activates the advance gate, and is also directly connected to the multi-media units, including the sound control circuit 106 and the picture control circuit 108.

The output from all of the decoder units is connected to the individual lights of the lighted keyboard display panel 110. The outputs from the decoder units are individual output lines which are connected to individual bulb circuits of the lighted keyboard display panel.

FIG. 3 shows the circuitry of FIG. 2. The keyboard 40 of FIG. 2 has seven output lines over which the ASCII digital coded signals are carried. Similarly, the tape reader 42 has seven output lines for matching coded signals transmitted by the reader unit. Each of these lines are connected to a register, such as storage register 124. It has an output line which is connected to the Bit gate 126 where the signal is compared to the incoming signal along line 128, so as to compare for a match between the two digital pulse signals of the binary code. The gate 126 and the other six gates are exclusive NOR units manufactured by Texas Instruments and having catalog No. SN7486. The output from each of the lines is fed to the Character gate 128 which is an SN 7430 eight input NAND gate which has a high output for an error and a low voltage output for a correct match. The eighth input line 130 to the gate 128 is connected from the reader ready circuit where a voltage is supplied by the student on depressing of the reader ready switch 132, or automatically when the tape advance signal is given when the previous depressed key has been a correct match.

The inverting gate 134 is an AND gate which serves as the error gate in the trainer unit, accepting the positive strobe pulse from gate 136 and the positive error output signal from the gate 128. The strobe pulse is a timing pulse of 5 microseconds with a 10 millisecond delay. This timing pulse is applied to both the error and Correct gate elements to insure that both circuits have been cleared and the effects of transient noise eliminated.

The error gate 134 ANDS the strobe pulse and the error signal, passing on negative voltage to the gate 138 forming half of the flip-flop circuit. The output from the AND gate 138 is inverted to supply a positive pulse to the second gate unit 140. This is also an inverting AND gate which ANDS the positive pulse output together with the voltage on the reset line, producing a negative output signal which is connected to the error light line 142 through an inverter and to the error counter transistor 144 through an inverter. The output is also applied to lock-out switch circuit 146 which acts as a testing mode switch. The signal output from the gate 138 is applied along line 148 to the master panel transistor control circuit and the stage 1 control switch.

The correct gate 150 NANDS the delayed strobe pulse from the gate 136, the inverted match signal output from gate 128, and condition of the line to the error lockout switch 146 which indicates that there is no outstanding error.

The output from the correct gate 150 provides an enabling pulse to the first gate stage 152 of the correct flip-flop circuit, activating the second gate stage 154, the output of which is connected through an inverter to the gate of the control transistor 156 for the Correct Counter. The output from gate 154 is also passed back along line 158 to insure reset of the second gate stage 140 of the error flip-flop circuit. The gate 140 can also be reset by means of the switch 160 which is the student's reset button.

The signal output from the Correct gate 150 is also carried along line 162 to the Advance gate 164 which is an OR gate which passes the signal through to the AND gate 166.

The index pulse line is also connected to the variable timer circuit 167, and the outputs from both the NAND gate 166 and the variable timer circuit are connected to the 20 millisecond delay multivibrator circuit 168. The tape advance timer circuit generally indicated at 170 includes a unijunction transistor circuit which generates timing pulses, the output of which is NANDED with the signal passing through the advanced key 172. These signals pass through the inverting AND gate 174 to the 20 millisecond delay multivibrator circuit 168 and to the base of the tape advance transistor 180. The output from the gate 166 or the variable timer circuit 167 produces a pulse to drive the circuit 168. The unit produces the required pulse width to drive the transistor for a sufficiently long length of time to drive the tape advance coil.

The output from the multivibrator 176 corresponds to the 80 millisecond lock circuit of FIG. 2, producing an 80 millisecond pulse which controls the rate of advance pulses through the AND gate 166.

The stage one switch 182 is ANDED with the error output from the error flip-flop circuit line 148 and its inverted signal applied to the gate 184, together with the output from the 80 millisecond lock circuit 176 to control the error lamp blink light, thereby controlling the blinking.

The second output from the 20 millisecond multivibrator 168 is passed through gates 186 and 188 which form the tape register gate circuit, referred to as 92 in FIG. 2. The output from this circuit is a pulse which passes along line 190 to the 7 storage registers to pulse the 7 storage registers, clearing them to receive the new signal from the tape reader lines 122.

Control of the display panel lights is effected by use of a column and row decoder arrangement which is connected to the 7 registers. The registers are storage register units which are Texas Instruments SN7475 units.

The output from the top three of these registers are each separately connected to the column decoder 192 which is a demultiplex unit, and corresponds to the column decoder 94 of FIG. 2.

One of the outputs from decoder 192 passes through the AND gate 194 to the four to sixteen line demultiplex unit 196 which has a connection to the four output leads 198 connected to the four individual row storage registers. Output lines 200 from the row decoder 196 control individual lights of the keyboard display panel by gating the light transistor circuits.

Similarly, the gate 202 passes the output from the column decoder 192 to the row decoder 204 where it is combined with the output of the four individual row registers which pass along lines 206. Row decoder 204, as well as the other row decoders are Texas Instruments SN74154 demultiplex units. The output from the row decoder 204 is passed along individual output lines 106 to additional individual lamps of the keyboard display panel.

The third output from the column decoder 192 is passed along and through the AND gate 210 to the row decoder 212 where the signal is combined with the row register storage signals passed along lines 214. The individual output lines 216 from decoder 212 are connected to additional individual lamp units of the display panel.

A single output signal from the column decoder 192 is passed to the row decoder unit 220 along the line 218 wherein it is combined with signals passed along incoming lines 222 from the four individual row register units. The shift control lines leave the row decoder 220 and pass along individual output lines generally indicated at 224. Most of these lines generally indicated at 226 pass to the advance gate 164. Additional output lines 228 are directly connected to lines 226 and to individual auxiliary units, such as a pictorial advance control in the multi-media unit, or to an audio control. These lines control both indexing of the tape, and the individual auxiliary support systems used with the keyboard trainer unit.

The row decoder unit 220 also has two pairs of shift control output lines, 230 and 232. Lines 230 are connected with the column decoder output line 234 and passed through the gates generally indicated at 236.

The shift gate 104 of FIG. 2 is equivalent to this circuit generally indicated at 238 in FIG. 3. Outputs 240 and 242 are connected to the numeric and alpha shifts to the keyboard, respectively.

FIG. 4 shows a circuitry for controlling one of the multi-media units, such as the pictorial advance control or the audio tape advance. The circuit shown applies particularly to a frame advance mechanism for the pictorial display, such as 34 of FIG. 1. The terminal 248 is connected to one of the leads 228 of FIG. 3 where it is passed through a pulse producing circuit 250 and through inverters 252 and 254. The amplifier 256 amplifies the signal and passes it out through the relay coil 258, closing the switch 260 to supply activating current to the frame advance unit of the pictorial display.

FIG. 5 shows the circuitry for controlling the display lights of the display panel. The plus voltage is supplied to terminal 262 to light the bulbs 264. Transistor 266 is an individual control transistor associated with each bulb which has an activating gate current applied to line 268 from one of the output lines of one of the row decoders of FIG. 3. This activates a transistor so that current can pass through it to the master control transistor 270. Transistor 270 is a control transistor to which all of the lines from the transistors of all bulbs run. A gate pulse to permit current to pass through ground is passed along line 272. This current is supplied through the gate 184 of FIG. 3.

OPERATION

The program text including the keys to be struck by the student is supplied by paper perforated tape 32 which is placed within the tape reader unit 12 by the student preparatory to beginning the exercise. The switch 28 is thrown and the student is ready to begin. For the beginner, the mode switch 26 is turned to the Skill Stage One marking, and the first key to be struck by the student will be lit on the display panel 18.

The display panel had the symbols of the typewriter keyboard thereon, although these symbols are not shown in FIG. 1.

With the appearance of the first letter to be struck on the display panel, which shows both the letter name and the key position on the blank keyboard, the student strikes this key to begin the exercise.

On striking of the matching key on the keyboard, the perforated tape is automatically advanced to the next key to be struck, and the corresponding light on the display panel is lit. The display panels themselves disclose in addition to the key designation, a color coding arrangement of groups of keys which are associated with given fingers of the operator. The display in this manner acts as a que or prompt for the student showing him not only the key to be struck, but also the finger to be used in striking the key. This technique, with the keyboard acting as a prompt for the key to be struck, permits the student to learn the keyboard in half of the normally required time using conventional classroom instruction techinques.

The program is presented to the student at his own accomplishment pace, when he is ready for the next succeeding symbol, inasmuch as once a correct key is pressed the succeeding key to be depressed is immediately presented to the student on the display panel. Accordingly, the student proceeds either at a fast or slow pace depending upon his individual ability.

In the event of an error, where an incorrect key is struck, the error light 24 is lit, and the student must depress the error reset key 25 located at the lower right-hand corner of the keyboard. This error recognition technique, coupled with the cueing of the student reinforces the student's awareness of the key and the error made, minimizing repeat errors of that type.

In FIG. 3 the error reset switch is indicated at 160, and the error and correct transistor control circuits are respectively shown at 144 and 156.

In Skill Stage Two the program is still presented to the student through the tape, but the display lights which act as a cue for the student in Skill Stage One do not light to present the program. This is brought about by turning the mode switch 26 of Figure to the Skill Stage Two position. This acts to open switch 182 of FIG. 3 so that there is no signal passed through gate 184 to the master control transistor to 70 of FIG. 5 unless an error signal is passed along line 148 of FIG. 3. The master control transistor 270 when gated to the off position prevents any of the display lights of the display panel from lighting.

In Skill Stage Two the student has a prepared text which is matched by the program on the perforated tape. The student types from the prepared text and the perforated tape program makes it possible to compare his accuracy. It is also possible in this stage to present material to the student through the multi-media unit either with the visual display panel 34 or with an audio sound track. It should be noted that the student is again proceeding at his own pace, so that a multi-media code for shifting the frame, or advancing an audio tape to present instruction to the student, can be given in any time frame, inasmuch as the student will only move the perforated tape in the reader after completion of the instruction from the multi-media unit 14 when he begins the exercise he is instructed to perform.

The multi-media control signal comes from the row decoder block 96 of FIG. 2 and the row decoder unit 220 of FIG. 3. Note that this control pulse goes out to the multi-media unit along line 228 and simultaneously passes an index pulse through the advance gate 164. The visual and audio programs can be presented separately or simultaneously to the student as desired.

Test mode stages for Stages One and Two eliminate the need for depressing the reset switch 25 of FIG. 1 (switch 160 of FIG. 3). These test modes provide a means for continuously measuring a students progress. The mode switch 146 of FIG. 3, which is a lockout switch the details of which are now shown, is bypassed providing a direct signal from the flip-flop gate 140 to the error gate 150.

An additional testing sequence, wherein the student is paced by the machine is also available to the student, wherein the program tape reader is advanced at a certain rate equivalent to a selected typing speed. The variable timer 167 shown in FIG. 3 is set to bypass gate 166 and supply an output to the multi-vibrator circuit 168 to automatically advance the tape at a given time after a previous index pulse had been received. This feature makes it possible for the instructor to present the typing program to a student at any pre-selected given rate, for example, 20 or 30 words a minute. If the student is proficient at this speed he will keep ahead of the variable timer controlled advance and avoid an error score for miss-match of tape reader and keyboard input. If he falls below the desired rate his error count will markedly increase.

The variable timer when used in Skill Stage One will enable the student to gauge for himself the typing speed in which he can operate the keyboard.

With regard to the multi-media devices, it should be noted that the adaptability of the keyboard trainer unit permits the presentation of visual and audio material of any type so that it is possible to teach spelling, shorthand, code, specialized number drills, and tabulation drills with the use of a typewriter keyboard. It is also possible to teach reading with this unit.

The keyboard unit can be used to teach other skills, such as shorthand, using the multi-media equipment. The visual presentation of the shorthand symbol is given to the student and the student required to type the written equivalent of the symbol. For example, a picture of a sentence written in shorthand can be presented on the screen by the multi-media output coded signal. The student would type the sentence shown, and the keyboard trainer unit program which has the typed sentence encoded compares the typed material in correct form to see whether the sentence presented was correctly typed by the student.

It can be seen that the keyboard trainer described above is a versatile composite machine open to many different areas of instruction. The use of dedicated or passive logic in the machine, wherein a simple comparison to a perforated tape input is made, gives the machine the performance of many complex computer type systems, without the requirement of storing vast amounts of data.

While this invention has been described, it will be understood that it is capable of further modification, and this application is intended to cover any variations, uses and/or adaptations of the invention following in general the principle of the invention and including such departures from the present disclosure as come within known or customary practice in the art to which the invention pertains, and as may be applied to the essential features hereinbefore set forth, as fall within the scope of the invention or the limits of the appended claims.

What we claim is:

1. A self-contained desk model electronic keyboard trainer, comprising:
   a. a desk size housing having a substantially horizontal keyboard with a plurality of keys spaced and aligned to match the keyboard of the machine the student is to learn,
   b. a substantially vertical and rearwardly inclined keyboard display panel disposed on the housing above and behind the keyboard and having a plurality of indicator lights with illuminable indicia areas corresponding in position and size to the keys of the keyboard, the indicator lights being connected to an electrical control circuit,
   c. each key of the keyboard connected to an electronic code producing means for generating a distinct and different coded output for each key depressed and which has a plurality of electrical output lines over which the code is transmitted when a given key is depressed, d. program means for producing a distinct coded output signal for a given key over the same number of output lines and matching the code produced by the keyboard code producing means, and being controlled by an actuating means which contains successive code markings representing keyboard keys of a predetermined prepared keyboard exercise, e. each of the output lines of the program means being connected to a storage register having two output lines, one of the output lines being connected to row and column decoder means which form part of the electrical control circuit for the indicator lights of the keyboard display panel, f. electrical comparator means for comparing code outputs of the keyboard electronic code producing means and the program means, including an array of gates, one for each code output line, which have two input terminals, one terminal connected to an output line from the code producing means, and the other terminal to the matching output line from one of the storage registers, the gate output signals reflecting whether there is a match of signals received, g. error circuit means connected to and receiving the gate array output and including an electrical advance signal generating circuit means electrically connected to the program means for giving an advance signal to the control means to advance the actuating means to thereby present the succeeding key code signal when the gate outputs all indicate a match between the two code signals received, and h. mode switch means on the housing, connected in circuit with the error circuit means and the indicator lights for permitting the student to determine whether the display panel will visually present the keyboard exercise key by key, or whether the display panel will only light an indicator light after an error has been made to show the correct key of the keyboard which should have been depressed by the student.

2. The self-contained desk model electronic keyboard trainer as set forth in claim 1, wherein:
a. the error circuit includes delay means for insuring that the respective circuits have been cleared and the effects of transient noise eliminated.

3. The self-contained desk model electronic keyboard trainer as set forth in claim 1, wherein:
a. the housing contains an error light and associated control circuitry connected to the error circuit to control activation thereof.

4. The self-contained desk model electronic keyboard trainer as set forth in claim 1, wherein:
a. the program means produces a digital coded output, and
b. the actuating means is a perforated tape.

5. The self-contained desk model electronic keyboard trainer as set forth in claim 1, wherein:
a. the array of gates are exclusive NOR gates, and
b. the outputs of the NOR gates are connected to a NAND gate, the output of which is connected to the input of the error circuit means.

6. The self-contained desk model electronic keyboard trainer as set forth in claim 5, wherein:
a. the input of the error circuit means includes an inverting gate having two input terminals, and
b. one of the input terminals being connected to the output of the NAND gate, and the second terminal being a timing line to which a delay pulse is applied to insure that curcuits have been cleared and the effects of transient noise have been eliminated.

7. The self-contained desk model electronic keyboard trainer as set forth in claim 1, wherein:
a. error indicating means is mounted on said housing for showing the total number of errors made by the student, and
b. error totaling means for totaling the number of errors made by the student has its input connected to the error circuit means and its output connected to the error indicating means.

8. The self-contained desk model electronic keyboard trainer as set forth in claim 1, wherein:
a. special instruction means is disposed adjacent the housing for presenting material to the student which is associated with the keyboard exercise, and
b. the program means includes a special control line connected to the instruction means for changing the material presented to the student as the keyboard exercise is presented.

9. The self-contained desk model electronic keyboard trainer as set forth in claim 1, wherein:
a. variable timer means is connected in circuit with the program means for varying the time interval between successive code outputs.

10. The self-contained desk model electronic keyboard trainer as set forth in claim 1, wherein:
a. audible output means is connected to the program means for giving an audible signal indicating the key on the keyboard corresponding to the signal produced by the program means.

11. A self-contained desk model electronic keyboard trainer, comprising:
a. a keyboard having a plurality of keys each of which produce a distinct coded output signal when depressed,
b. program means for producing a coded signal corresponding to that produced by each key of the keyboard,
c. electrical comparator means connected to the keys of the keyboard and the program means for receiving and comparing a coded signal from a depressed key and the coded signal from the program means, for producing an output dependent on a match or non-match of the coded signals received,
d. display means connected to the program means for indicating the key on the keyboard corresponding to the current key signal produced by the program means,
e. the program means includes a perforated tape reader and a perforated tape, and
f. error recording means connected to the comparator means which includes an ink marker for marking the perforated tape when a key depressed on the keyboard does not correspond to the key marking code on the perforated tape.

12. The self-contained desk model electronic keyboard trainer as set forth in claim 11, wherein:
a. error recording means is connected to the output of the comparator means for counting the total number of non-match signals received from the electrical comparator means.

13. A self-contained desk model electronic keyboard trainer, comprising:
   a. a desk size housing having a substantially horizontal keyboard with a plurality of keys spaced and aligned to match the keyboard of the machine the student is to learn,
   b. a substantially vertical and rearwardly inclined keyboard display panel disposed on the housing above and behind the keyboard and having a plurality of indicator lights with illuminable indicia areas corresponding in position and size to the keys of the keyboard, the indicator lights being connected to an electrical control circuit,
   c. each key of the keyboard connected to an electronic code producing means for generating a distinct and different coded output for each key depressed and which has a plurality of electrical output lines over which the code is transmitted when a given key is depressed,
   d. program means for producing a distinct coded output signal for a given key over the same number of output lines and matching the code produced by the keyboard code producing means, and being controlled by an actuating means which contains successive code markings representing keyboard keys of a predetermined prepared keyboard exercise,
   e. each of the output lines of the program means being connected to a storage register having two output lines, one of the output lines being connected to row and column decoder means which form part of the electrical control circuit for the indicator lights of the keyboard display panel,
   f. electrical comparator means for comparing code outputs of the keyboard electronic code producing means and the program means, including an array of gates, one for each code output line, which have two input terminals, one terminal connected to an output line from the code producing means, and the other terminal to the matching output line from one of the storage registers, the gate output signals reflecting whether there is a match of signals received,
   g. error circuit means connected to and receiving the gate array output and including an electrical advance signal generating circuit means electrically connected to the program means for giving an advance signal to the control means to advance the actuating means to thereby present the succeeding key code signal when the gate outputs all indicate a match between the two code signals received,
   h. the input of the error circuit means includes an inverting gate having two input terminals, and
   i. one of the input terminals being connected to the output of the NAND gate, and the second terminal being a timing line to which a delay pulse is applied to insure that circuits have been cleared and the effects of transient noise have been eliminated.

14. The self-contained desk model electronic keyboard trainer as set forth in claim 13, wherein:
   a. error indicating means is mounted on said housing for showing the total number of errors made by the student, and
   b. error totaling means for totaling the number of errors made by the student has its input connected to the error circuit means and its output connected to the error indicating means.

* * * * *